(12) United States Patent
Larsson

(10) Patent No.: US 6,899,231 B2
(45) Date of Patent: May 31, 2005

(54) SETTLING DEVICE

(75) Inventor: Hans F. Larsson, Vasterhaninge (SE)

(73) Assignee: Nordic Water Products AB, Vastra Frolunda (SE)

( * ) Notice: Subject to any disclaimer, the term of this patent is extended or adjusted under 35 U.S.C. 154(b) by 94 days.

(21) Appl. No.: 10/301,810

(22) Filed: Nov. 22, 2002

(65) Prior Publication Data
US 2004/0031750 A1 Feb. 19, 2004

(30) Foreign Application Priority Data
Aug. 14, 2002 (SE) .............................. 0202420

(51) Int. Cl.⁷ .............................................. B01D 21/24
(52) U.S. Cl. ..................................... 210/521; 210/540
(58) Field of Search ................................ 210/521, 522, 210/538, 540

(56) References Cited

U.S. PATENT DOCUMENTS

| 3,346,122 A | * | 10/1967 | Cornelissen | 210/522 |
| 3,886,064 A | * | 5/1975 | Kosonen | 210/522 |
| 3,928,209 A | * | 12/1975 | Engdahl et al. | 210/522 |
| 4,889,624 A | * | 12/1989 | Soriente et al. | 210/522 |
| 4,980,070 A | * | 12/1990 | Lieberman | 210/522 |
| 5,049,278 A | * | 9/1991 | Galper | 210/521 |
| 5,173,195 A | * | 12/1992 | Wright et al. | 210/521 |
| 5,236,585 A | * | 8/1993 | Fink | 210/521 |
| 5,366,638 A | * | 11/1994 | Moore | 210/521 |
| 5,536,409 A | * | 7/1996 | Dunkers | 210/540 |

OTHER PUBLICATIONS

Waterlink; GEWE Plate Settler System 1999 Brochure.
Waterlink; Super Settler, Inclined Plate Settler (1999) Brochure.

* cited by examiner

Primary Examiner—Christopher Upton
(74) Attorney, Agent, or Firm—Jacobson Holman PLLC

(57) ABSTRACT

A settling device (1) for liquid treatment including a plurality of inclined, spaced-apart panels (5) each providing an upper settling surface for receiving settled out solid contents of the liquid to be treated, wherein the panels (5) are supported in a box-like structure (2,3,4) including two side walls, and wherein said device includes an inlet or inlets for liquid to be treated and an outlet or outlets for purified liquid. At least one of the side wall sides of the box-like structure (2,3,4) is provided, at the top, with a top portion to be positioned vertically so as to obtain a purified liquid level inside the device between a low level which is below a upper portion of the inclined panels and a high level which is above said upper portion of the panels.

14 Claims, 6 Drawing Sheets

SETTLING DEVICE

FIELD OF THE INVENTION

This invention concerns a settling device according to the preamble of claim 1.

BACKGROUND OF THE INVENTION

Inclined plates are commonly used in settling devices for settling tanks to increase settling area and thereby capacity to clarify liquid.

The liquid, most often water, to be treated is distributed, together with its contents of undesired suspended solids, from an influent channel to liquid lamellas which are formed between the inclined plates. It flows upwardly during settling of the suspended solid particles and subsequently reaches an overflow for clarified liquid.

The increase in capacity of settling tanks with inclined plates is due to the fact that the particles only have to move the short vertical distance to the lower plate in the liquid lamella in order to be separated. When the particles have reached the inclined plates they will slide down along the plates into a sludge holding volume which is positioned below the inclined plates. From there sludge is normally transported by a scraper or by gravity to a sludge hopper which it leaves as an underflow.

There are many configurations of inclined plate settling devices put on the market. The commercially most important ones are of the counter-current type i.e. the liquid under treatment flows upwards in the liquid lamellas while the settled out solids slide down the plates in counter-current to the liquid flow.

There exist two main types of counter-current inclined plate settling devices:

a. A first type having the inclined plates totally submerged in the liquid with outlet means for the clarified liquid at a level above the plates.

b. A second type having the upper portion of each inclined plate sticking out above the water level. In this case the clarified water runs sideways over a weir (weirs) into an effluent flume(-s) at a level below the top of the plates.

Both types can be constructed as plate packs for inclusion in concrete, plastic or steel tanks. Type a. devices are normally built and assembled in a workshop and shipped to the point of use, whereas the effluent flume/feed channel combination of the b. type settling device is built and assembled in a workshop and shipped to the point of use where it is mounted inside a concrete tank by bolting it to anchoring pieces in the concrete walls. The plates are then mounted inside the tank one by one at site.

Inclined plate settling devices have basically been built in the same way for more than 20 years. Because of the complexity of making and installing prior art settling devices, there is a great need and demand for a simpler, more cost-effective inclined plate settling device.

AIM AND MOST IMPORTANT FEATURES OF THE INVENTION

It is an aim of this invention to present an inclined plate settling device which solves the problem of the prior art.

Hereby it has been made possible to build inclined plate settling devices according to both of types, a. and b., based on the same constructional elements through only simple adjustment during construction or during assembly. This way both what is generally required for applications where the demand is that the inclined plates should be sticking out from the liquid or that the inclined plates should be totally submerged in the liquid may be fulfilled.

The device according to the invention is preferably constructed as a pack to be placed in a tank or in a volume of liquid or used as a free-standing unit. In the latter case the device is completed so as to form a tank unit by its own.

Each such pack consists preferably of an inclined box having a parallelepiped shape with sidewalls and end walls, but no top and bottom walls, in which the plates are placed on internal supports.

When the device is made operational, the parallelepiped box is placed in a tank or a volume of liquid so that its upper end sticks out of the liquid. Each side wall is arranged so that it will end at or below a lowest possible liquid level during operation of the settling tank or the volume of liquid.

Depending on whether a type a or type b device is desired, a top portion defining a top plate or a weir is arranged at the side wall side with its upper part either positioned such that the inclined settling plates are totally submerged or defining a weir adapted at the desired level for allowing clarified liquid to run over it at a level below the top of the settling plates. In the first case, type a., clarified liquid would suitably fall into one or more effluent flumes positioned at a level above the inclined plates. In one embodiment, a perforated plate can be placed on top of the settling plates and the effluent leaves over a side weir into an effluent flume.

Each top portion defining a top plate or a weir is positioned in a sealed relationship against the side wall, either sealing directly or indirectly.

In a type b settling device clarified liquid would suitably fall into one or more effluent flumes which would be provided fastened at the outside of the plane of the side wall(-s).

In both cases the liquid from inside the pack will discharge into the effluent flume(s) which in turn is (are) connected to (an) outlet opening(s).

By changing the vertical position (or at occasion size of holes) of the weir or holes the level of liquid inside the settling device can be changed. It is preferred that each weir which can be provided on one side wall of the corresponding effluent flume is a part of the flume. The flumes and/or the weirs are suitably functioning as reinforcement of the box-structure of the parallelepiped box.

The weir can be provided with a saw-tooth shaped v-notch or other notch arrangement along its top for controlling the overflow of the clarified liquid. This makes adjustment of draw-off of clarified liquid easier. If one notch is provided for each liquid lamella it can be established that clarified liquid is drawn off from each liquid lamella and that there is no obstruction in the passage.

In case the plates are submerged in the liquid, effluent flume(s) can be placed above the plates.

In general, the flow into the flumes, and thereby the distribution and flow of water between the liquid lamellas, can be controlled either by throttling holes below the liquid level or by overflow weirs. Such overflow weirs may be fitted with the above mentioned notch arrangements. A combination of effluent flumes above the plates and a side-mounted effluent flume into which the top flumes discharges can also be used.

BRIEF DESCRIPTION OF DRAWINGS

Further advantages are obtained by other aspects of the invention which will be evident from the following detailed description together with drawings, wherein.

DETAILED DESCRIPTION OF EMBODIMENTS

Figure 1A:
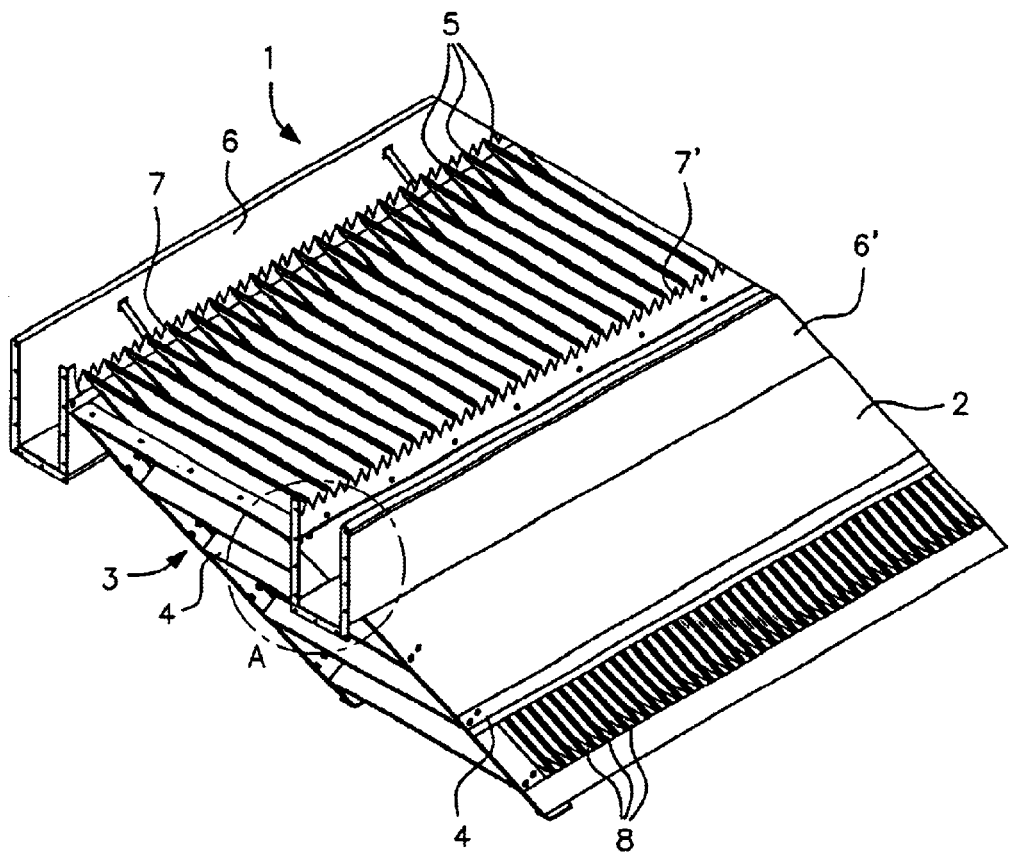
FIG. 1a shows a settling device according to a first embodiment of the invention.

FIG. 1a shows in general a settling device 1 having the general box-like structure shape such as that of a parallelepiped box with side walls, one indicated with 2, and end walls, one indicated with 3. The side walls 2 and end walls 3 include reinforcement means 4 so as to define the box shape.

The side walls are preferably bolted or welded to the end walls at assembly to form a box. Inside the box, a number of inclined panels or settling plates 5 are positioned so as to define between them a corresponding number of liquid lamellas when the device is in operation. The side walls terminate at a position below a region defining a low level of the liquid inside the box. There is, however, according to the invention, provided a top portion at the top of each side wall side such that the purified liquid level can be set as desired. Thus it is possible to very easily modify the device so that it is either of type a. or type b.

At the top there is thus positioned on each side, outside the side walls, a strip shaped weir 7, 7', having an upward directed saw-tooth shape with a number of upwardly directed v-notches. In use of the settling device clarified liquid having passed the inclined settling plates will run over the weirs 7, 7' and fall into an effluent flume 6, 6' being positioned outside each weir 7, 7'. The effluent flumes are used for discharging the clarified liquid from the settling device.

As can be seen from FIG. 1a, the settling device 1 is open upwardly and the positions of the weirs are such that the embodiment shown is a b. type settling device, that is having the inclined settling plates sticking out above the liquid level. Further, the parallelepiped box is open downwardly (not shown) in order to allow settled solids that slide downwardly along the settling plates to fall down into a sludge compartment of the tank or the liquid volume where the settling device 1 is intended to be positioned. Below the side wall 2 there is an open area allowing liquid to be treated to flow into the liquid lamellas between the respective inclined settling plates 5. Inlet ports 8 are defined for each liquid lamella by the respective inclined plates in said open area. Inlet ports 8 are preferably arranged also at the other side of the settling device 1 (not shown).

The inclined settling plates at their sides which are directed at the inlet area, as defined by the plurality of inlet ports 8, can be provided with bent rim portions directed upwardly in order to reduce the impact of inflowing liquid through the inlet ports 8 on already settled material on the inclined settling plates.

Figure 1B:
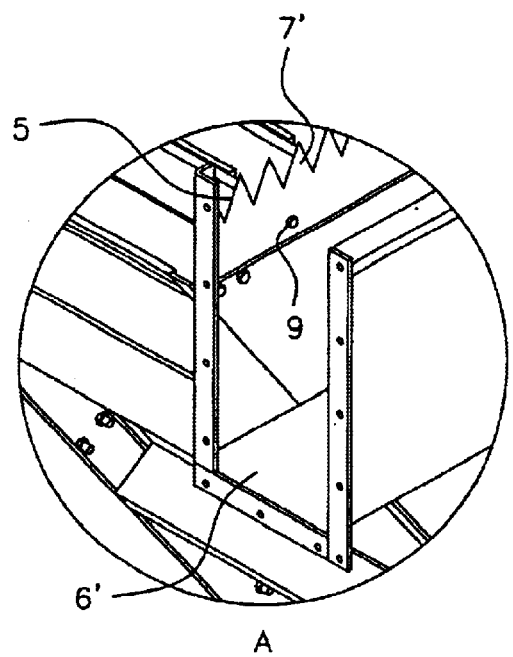
FIG. 1b shows a detail thereof in an enlarged scale.

FIG. 1b shows in greater detail an upper portion of the settling device with the weir with a vertical oblong hole 9 for allowing adjustment of the weir.

It is preferred that the weir 7, 7' is mounted together with the respective effluent flumes 6, 6' in order to simplify assembly at the site of use. It should also be noted that the effluent flumes 6, 6' function as stabilisers for the upper portions of the side walls 2. According to one modification the weir is an integral part of the corresponding effluent flume.

Figure 2A:
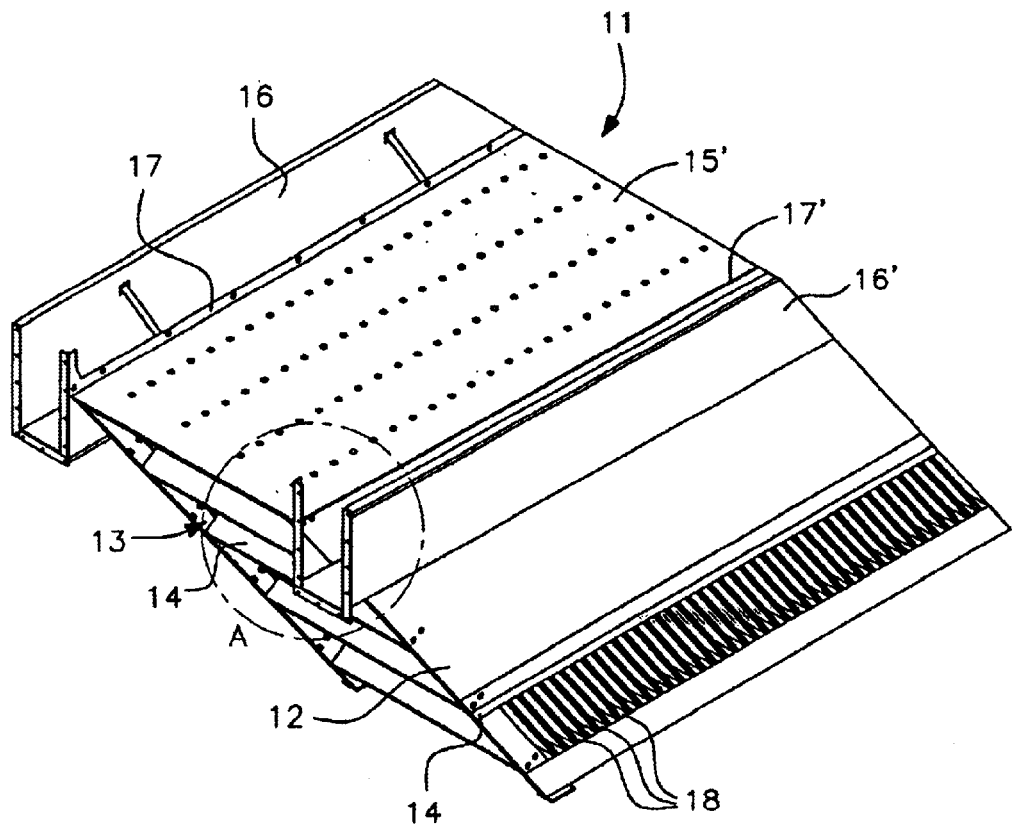
FIG. 2a shows a settling device according to a second embodiment of the invention.

A second embodiment is shown in FIG. 2a, where a settling device 11 having walls 12, 13, reinforcement means 14, inlet ports 18 and effluent flumes 16, 16' is shown. At the top of the settling device 11 there is arranged a cover plate 15 for distribution of the flow evenly through the settling device, and having holes for allowing passage of clarified liquid. In this case weirs 17, 17' are positioned with the top at a level above the cover plate such that the settling device 11 will be a representative of the type a. settling device as defined above. This means having the inclined settling plates (not shown in FIG. 2a) completely submerged under the water level.

Figure 2B:
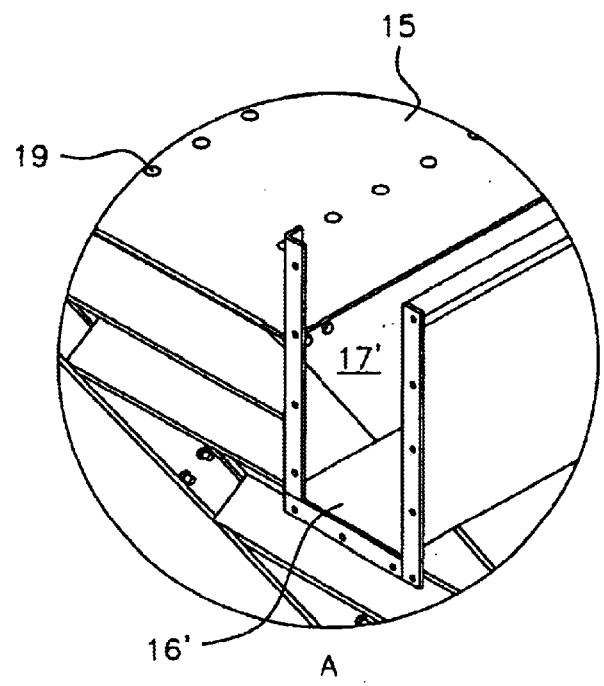
FIG. 2b shows a detail thereof in an enlarged scale.

In FIG. 2b an upper portion of the settling device 11 is shown in more detail, wherein more clearly the effluent flume 16' is shown having an open channel-shape and a weir defined by a straight edge of a plate 17'. The cover plate 15 is shown with through-holes 19 for clarified liquid.

Figure 3A:
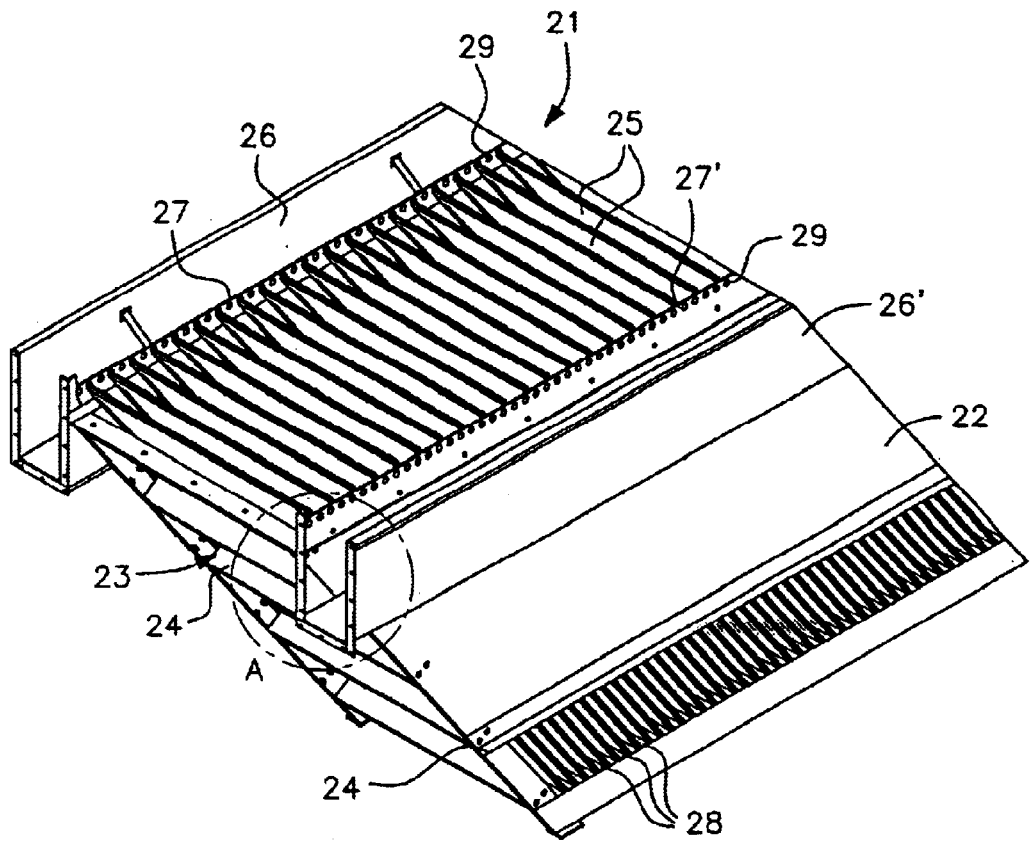
FIG. 3a shows a settling device according to a third embodiment of the invention.

A third embodiment is shown in FIG. 3a where a settling device 21 having walls 22, 23, reinforcement means 24, effluent flumes 26, 26' and inclined settling plates 25 is shown. Weirs 27, 27' are in this case provided with holes 29 at regular intervals along the extension such that in operation it is possible to monitor the operation by studying liquid outflow through these holes in order to discover if there has become any obstructions in a lamella between two or more of the inclined settling plates 25.

Figure 3B:
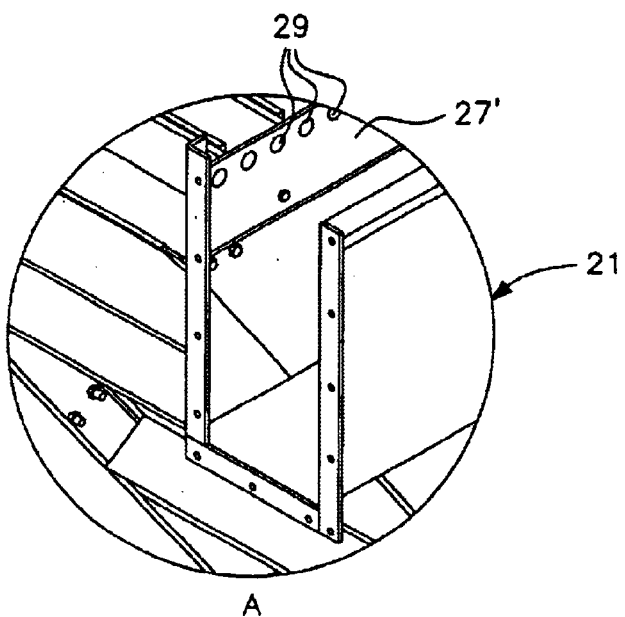
FIG. 3b shows a detail thereof in an enlarged scale.

In FIG. 3b, a portion of the settling device 21 is shown in more detail, with the holes 29 along the extension of the weir plate 271.

Figure 4A:
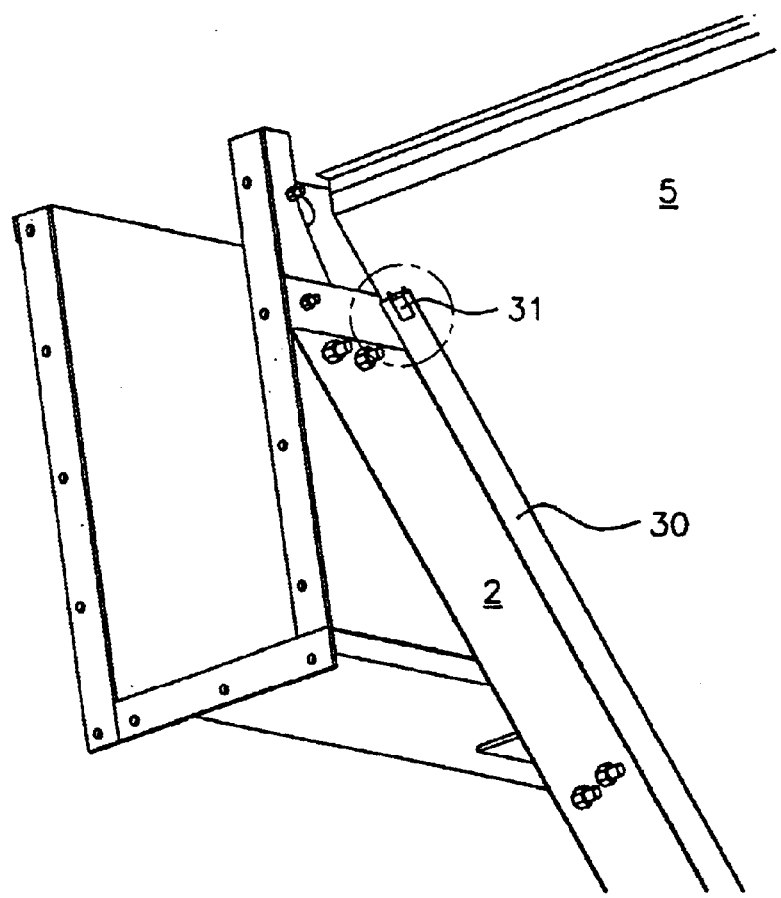
FIG. 4a shows an arrangement of inclined plate support.
Figure 4B:
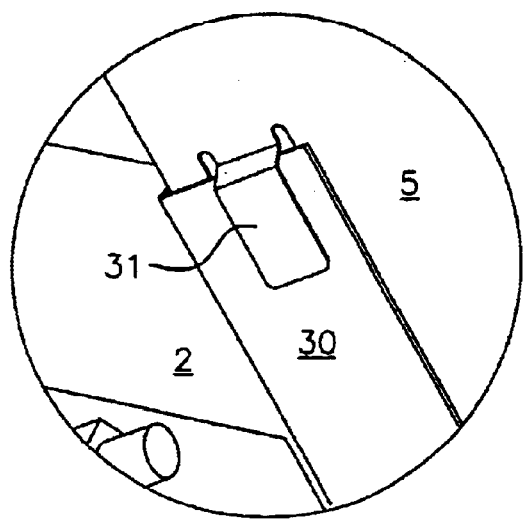
FIG. 4b shows a detail thereof in an enlarged scale.

In FIGS. 4a and b it is shown how an inclined settling plate 5 is supported in the settling device. A support rail 30, constituting a support element, and with an L-shaped crosssection is fixed on the inside of each side wall (one indicated with 2). It should be understood that for each plate 5 there is one support rail 30 on each side.

In order to position the settling plate 5 in the vertical direction there is provided a clip portion 31 which can be cut out from the plate material of the settling plate 5 and bent twice so as to form a clip-shaped holder, which co-operates with the upper edge of the support rail 30.

This way it is simple to obtain correct vertical positioning in a very simple way that simplifies assembly of the device and to secure that the settling plate 5 will not drop to the bottom of a tank or volume of liquid containing the settling device. Each support rail 30 can have L-shaped cross section whereby one shank of the L-shape is vertical so as to provide an upwardly bent portion also in an inlet area of the settling device. This way interference is avoided from incoming water to be treated with already settled solids on the settling plates. See discussion about the rim portions in connection with FIG. 1a.

Figure 5A:
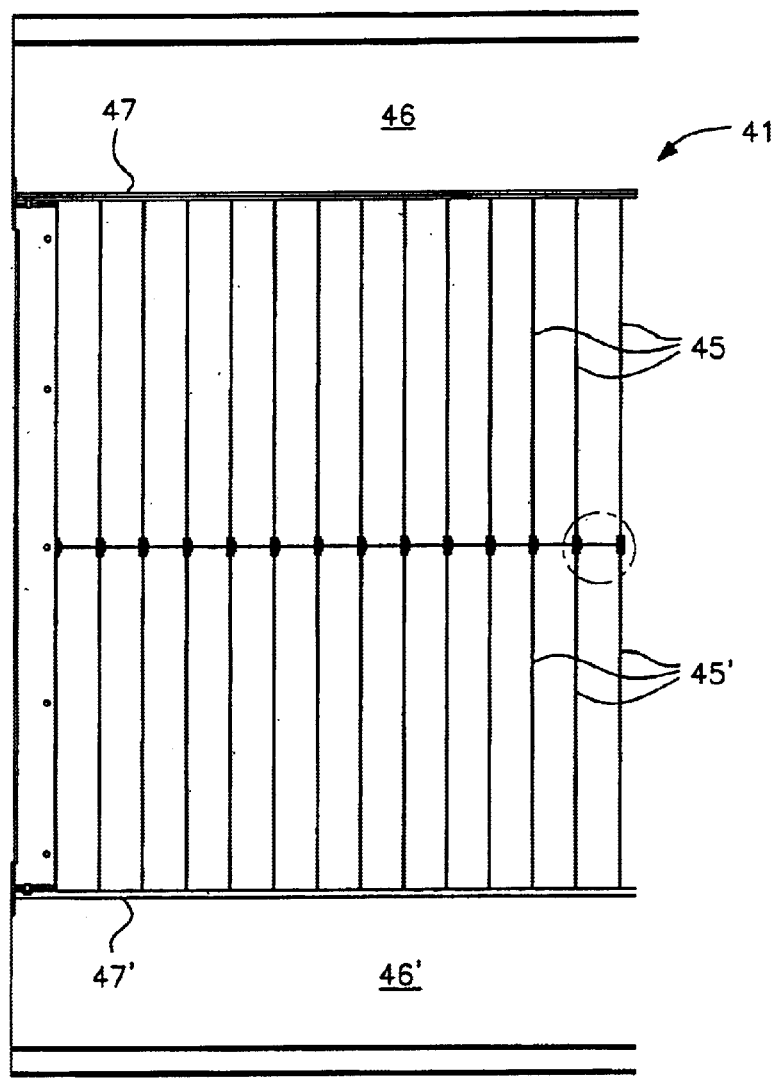
FIG. 5a shows a second arrangement of inclined plate support.

In FIG. 5a a settling device 41 is provided with central, profile shaped support pieces 48, which are arranged between two portions 45, 45', together making up a settling plate plane. 46, 46' indicate effluent flumes, 47, 47' indicate weirs. At the outer sides the panel portions are supported, e.g. by support rails (not shown).

Figure 5B:
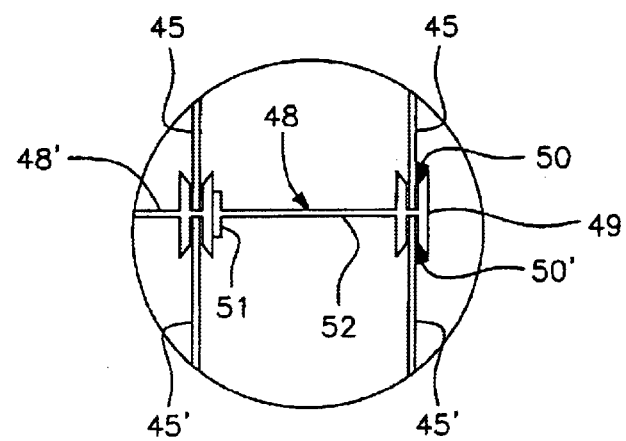
FIG. 5b shows a detail thereof in an enlarged scale.

In FIG. 5b the layout of the central support pieces 48 is shown in more detail. Each central support piece 48 includes an engagement portion 49, a distance portion 52 and a contacting portion 51. The engagement portion 49 has engagement slots 50, 50' for receiving inner edges of settling panel portions 45, 45' from each side. These slots 50, 50' include grip edges for obtaining good friction contact and safe engagement between each support piece and the corresponding panel portions. The distance portion 52 consists of a strip-shaped member 52, and the contacting portion 51 rests on a neighbouring central support piece 48'.

The purpose of the construction with central support pieces is to allow the construction of a relatively wide settling device 41 without risking that the settling panels bend by their own weight and by the weight of settled solids, which could result in one or more settling panels bending downwardly and thereby falling off their supports.

It should be noted that the central support pieces are elongated, strip-shaped and that they are shown in cross section in FIGS. 5a and b. This means that inflow of the liquid to be treated must be provided at each side wall side of the settling device 41 and/or the support pieces can be perforated.

Figure 6:
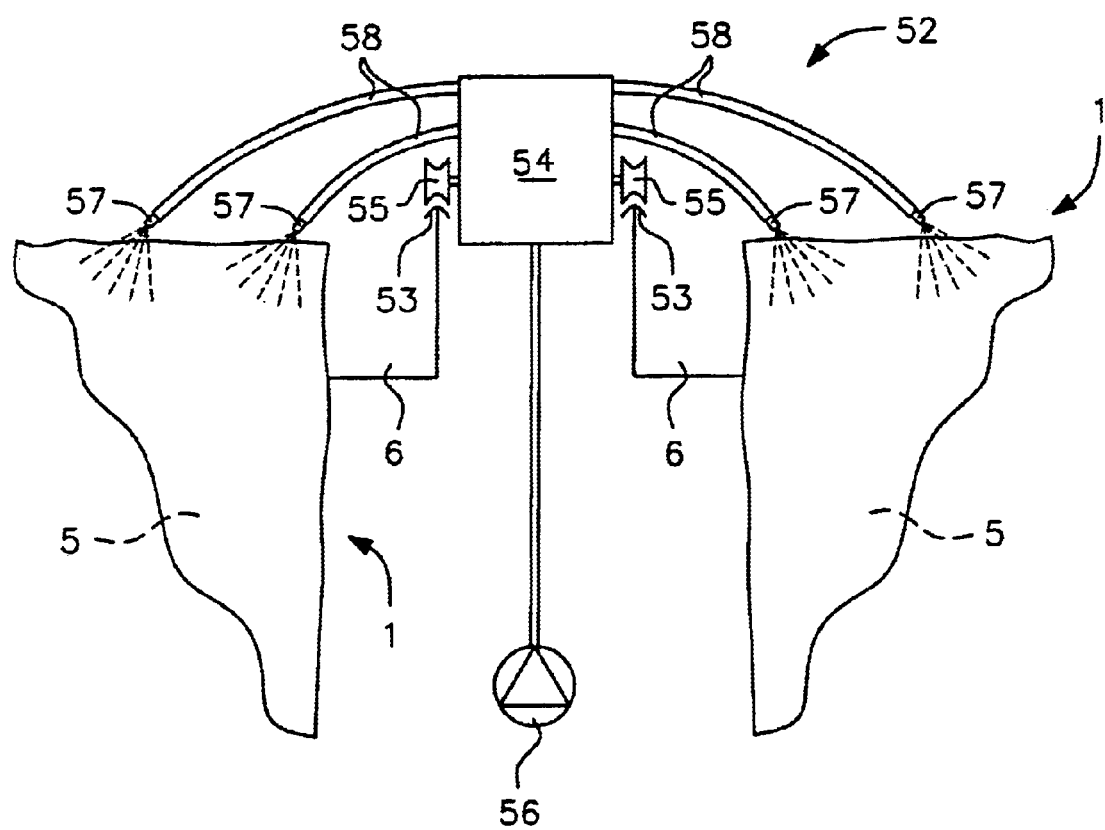
FIG. 6 shows schematically a cleaning arrangement in respect of settling devices according to the invention.

In FIG. 6 an arrangement 52 is shown for cleaning the inclined panels or plates 5 of two settling devices 1 which are arranged side by side with a certain distance from each other. The upper outer edges of the effluent flumes 6 of the two settling devices are constructed as rails 53 for a rail-mounted liquid jet device 54 having wheels 55. This device is connected to a pressure liquid source 56 and is equipped with rigid tubes 58 having nozzles 57 at their ends. In operation the device 54 is controlled in some way, either as a robot or simply by manual control, in order to successively clean the inclined panels 5 from settled out material that will not slide down by gravity forces. It is to be understood that the device 54 can be constructed otherwise, e.g. so as to serve one single settling device 1. In that case it is equipped with nozzles in one single direction and has support from a rail positioned opposite to the settling device to be cleaned. An advantage with this arrangement 52 such as the one shown in FIG. 6 is that cleaning can be effected during normal operation of the settling device.

The invention could be modified further and one modification is that in a type a. arrangement there are arranged effluent flumes directly above the settling plate in a per se known manner. It should be apparent to one skilled in the art that the top portions may be configured in various ways and at various levels according to what is desired in the particular case. Further the top portion may provide a weir or simply a wall, in which case purified water leaves the device over a weir positioned in any other way.

Further advantages are obtained through different aspects of the inventive device:

It is preferably manufactured as a kit and is shipped as stacked plates, walls and flumes, needing a minimum of transport volume and can hence be shipped at a low cost.

It is suited for installation in cramped locations where there is not enough space for installation of a conventional inclined settler device.

It does not need any sealing material between the plates and the surrounding walls.

It can make use of different materials for plates and walls.

It can have the plates sticking out of the liquid but still have no problem with fat, grease, oil and other floating material collecting under the bottom of the effluent flume.

It has no problem with material settling on the bottom of the feed channel.

It may have plates that are easily taken out of the inclined plate settler for inspection and/or cleaning.

It can easily be dismantled and be transferred in a very compact form for use at another location.

It fits very well together with a hydraulic sludge scraper in the sludge compartment allowing for a low volume of the overall settler.

It can easily be outfitted with an automatic cleaning-in-place system. An example of such a system includes a movable carriage equipped with nozzles for directing jets of liquid onto the inclined panels so as to remove more permanently settled material that has not slid down by its own weight.

It may have the feed ports formed by cutting away a lower part of the side wall at the end of the plates.

It may offer protection from disturbance by the feed flow onto the separated sludge sliding down the plates as well as for the cleaned liquid rising under the upper plate surface in the liquid lamella, since the profiles holding the plates continue down into the feed port area and thus blind off the parts of the feed ports that would otherwise be opening onto the flowing sludge or cleaned liquid respectively.

Is easily installed in a tank by placing the device or devices on supports and in the case of multiple devices by connecting the devices and the effluent flumes thereof to each other.

What is claimed is:

1. A settling device for liquid treatment, said settling device comprising
    a plurality of inclined, spaced-apart panels each providing an upper settling surface for receiving settled out solid contents of the liquid to be treated, the panels being supported in a box-like structure including two side walls, at least one inlet for liquid to be treated and at least one outlet for purified liquid,
    at least one of the side walls of the box-like structure being provided, at a top, with an adjustable top portion to be adjustably positioned vertically so as to obtain a purified liquid level inside the box-like structure between a low level which is below an upper portion of the inclined panels and a high level which is above said upper portion of the panels.

2. The settling device according to claim 1, wherein the top portion is a weir for purified liquid.

3. The settling device according to claim 2, wherein the weir has an upper saw-tooth shape.

4. The settling device according to claim 1, wherein the top portion has holes for purified liquid outflow.

5. The settling device according to claim 1, wherein a flume is arranged outside at least one of the side walls.

6. The settling device according to claim 5, wherein the flume is a reinforcing structural part of the box-like structure.

7. The settling device according to claim 1, wherein a plurality of inlet ports for inflow of liquid to be treated is arranged sideways in a low part of at least one side wall side of the box-like structure.

8. The settling device according to claim 1, wherein a support structure includes support elements for the support of the panels.

9. The settling device according to claim 8, wherein the panels include integral clip portions for positioning relative to the support elements.

10. The settling device according to claim 1, wherein the panels are supported centrally by profile-shaped central support pieces.

11. The settling device according to claim 10, wherein each central support piece includes an engagement portion for engagement with two panel portions making up a panel.

12. The settling device according to claim 1, wherein a cover plate is positioned above the panels and is provided with holes for through-flow of purified liquid.

13. The settling device according to claim 1, wherein a cleaning device is arranged to direct jets of liquid to the inclined panels.

14. The settling device according to claim 13, wherein the cleaning device is supported on rails for movement along the settling device.

* * * * *